Jan. 12, 1937.  M. A. WECKERLY  2,067,741
WEIGHING SCALE
Filed Dec. 18, 1931  4 Sheets-Sheet 1
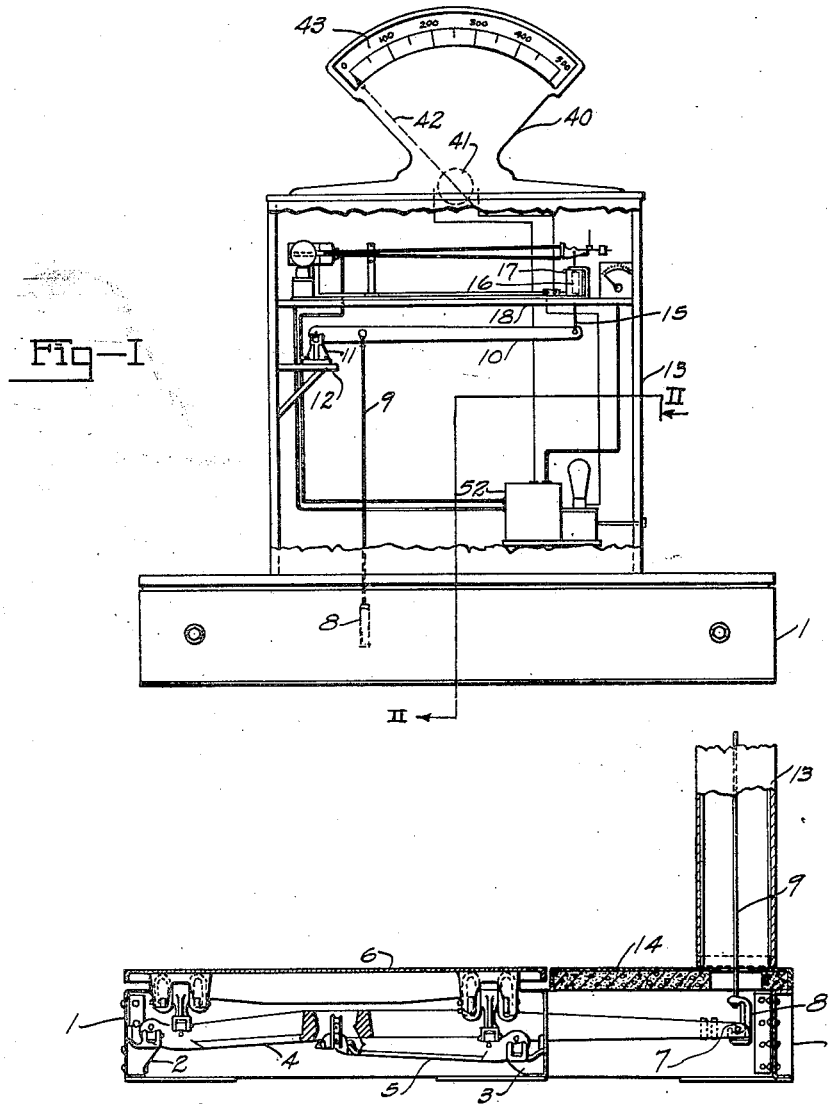
Mark A Weckerly
INVENTOR.
BY C O Marshall
ATTORNEY.

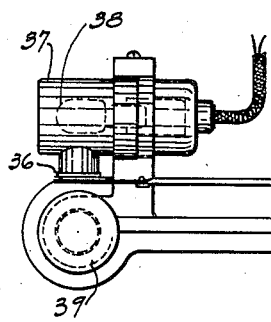
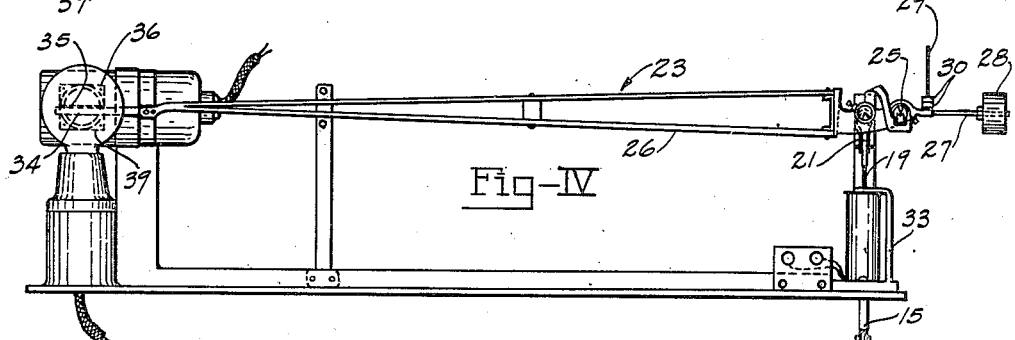
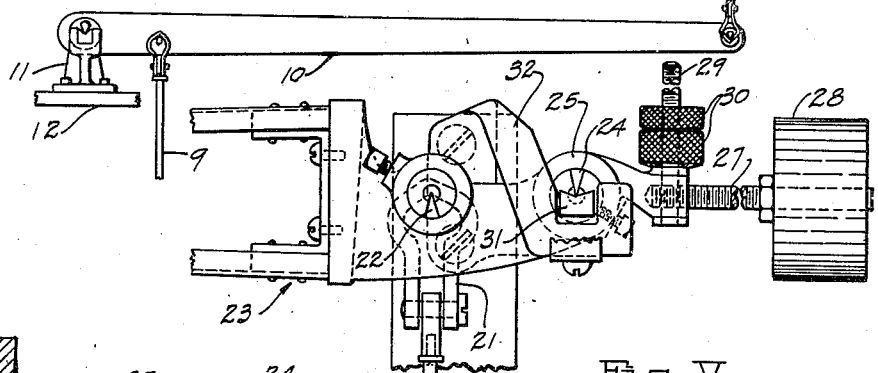
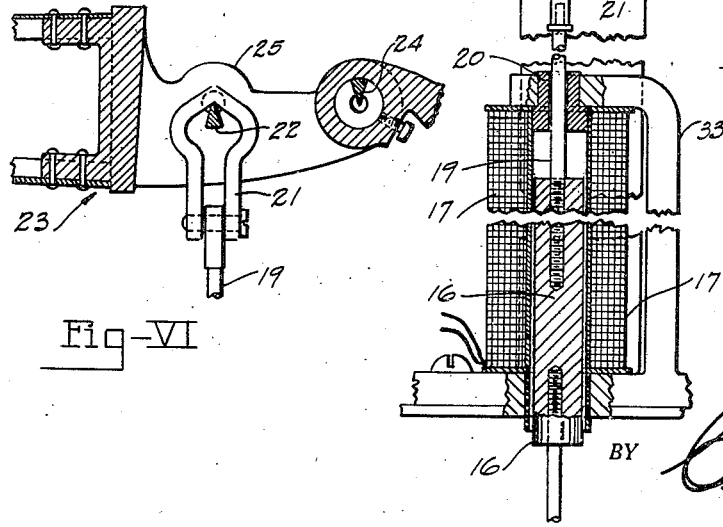

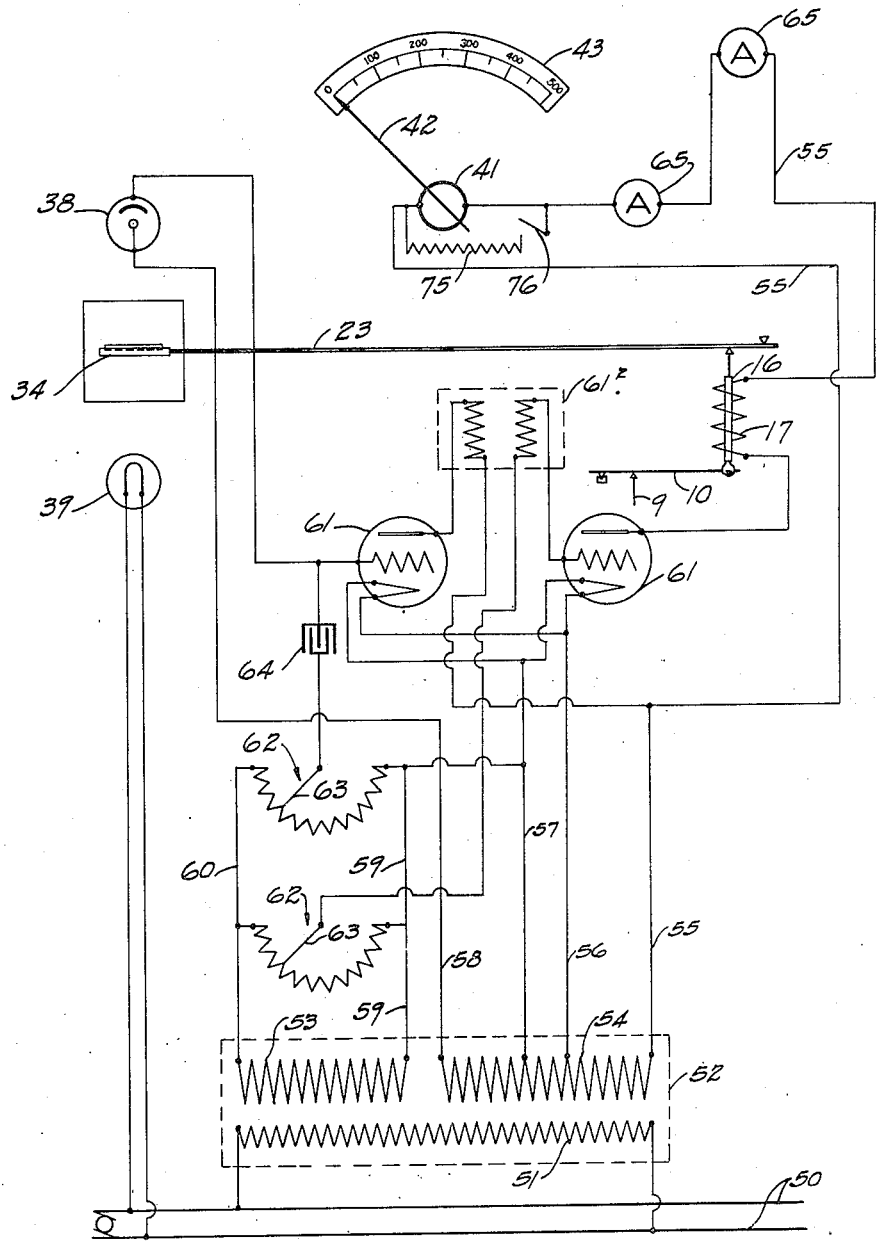

Jan. 12, 1937.  M. A. WECKERLY  2,067,741
WEIGHING SCALE
Filed Dec. 18, 1931  4 Sheets-Sheet 4
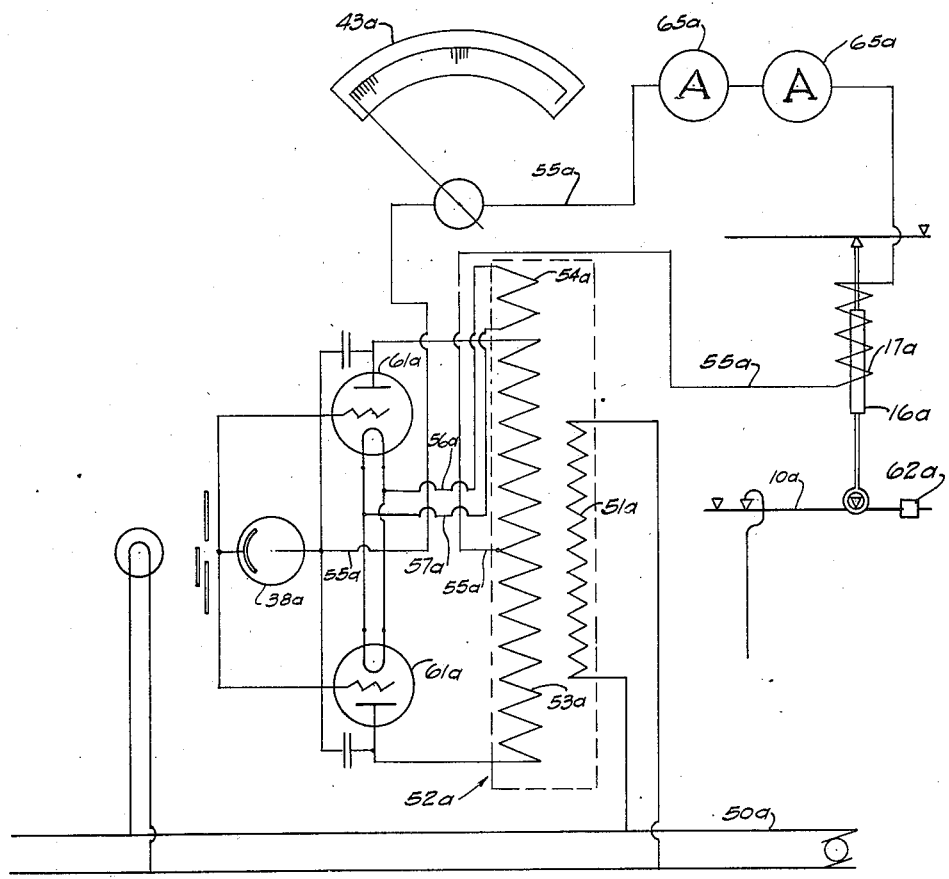
Fig-VIII
Mark A. Weckerly
INVENTOR.
BY *Marshall*
ATTORNEY.

Patented Jan. 12, 1937

2,067,741

UNITED STATES PATENT OFFICE 2,067,741

WEIGHING SCALE

Mark A. Weckerly, Toledo, Ohio, assignor to Toledo Scale Manufacturing Company, Toledo, Ohio, a corporation of New Jersey Application December 18, 1931, Serial No. 581,810

10 Claims. (Cl. 265—70)

This invention relates to devices for measuring and indicating weight by electrical means. The invention is applicable to balances which have such sensitivity that they may be termed "laboratory balances" and used for weighing minute particles of matter and it may also be embodied in weighing machines capable of determining the weight of very heavy loads.

I propose to control the electrical counterbalancing means with a photo-sensitive element in which an electrical current is controlled by the position of a movable scale member. The member does not come into physical contact with the sensitive element and there is no reactive influence on the weighing mechanism. The control is effected by the interruption or diminution of an intangible force which may be a ray of light or an emission of rays from the invisible part of the spectrum.

The principal object of my invention is the provision of improved means for controlling the flow of current in an electrical weight counterbalancing device.

Another object is the provision of means for electrically counterbalancing all of a variable load without assistance of or influence from a variable mechanical auxiliary support.

Another object is the provision of improved means which in operation to effect such control makes no physical contacts and exerts no reactive influence on weight determining and indicating mechanisms of the device.

Another object of my invention is the provision of improved means for controlling the flow of electric current through a coil in a weighing device so that its amount is proportional to the weight of a load on the weighing platform.

Another object is the provision of improved means for proportioning such electrical current to the weight of the load by means of a wave-sensitive device.

A still further object is the provision of improved means for amplifying the relatively small current passed by such sensitive member.

A still further object is the provision of improved means for counterbalancing loads by electromagnetic means.

A still further object is the provision of means for readily altering the capacity of the indicating means a definite amount.

Another object is the provision of means for indicating the weight of a load regardless of the proximity of such indicating means to the weighing device.

An ancillary object of the invention is the provision of means for making simultaneous indications of the weight of a load at points remote from each other.

These and other objects will be apparent from the following description, in which reference is had to the accompanying drawings and wherein similar reference numerals designate similar parts throughout the several views.

In the drawings:—

Figure I is a front elevational view, portions broken away, of a weighing device embodying my invention.

Figure II is a sectional view through the base mechanism substantially along the line II—II of Figure I and showing a fragment of the mechanism cabinet.

Figure III is an enlarged fragmentary plan view of the electrical current controlling means.

Figure IV is a side elevational view thereof.

Figure V is an enlarged fragmentary side elevational view showing the load-counterbalancing coil in detail and portions of the operative connection to the emission control lever.

Figure VI is a fragmentary cross sectional view through the fulcrum of the emission control lever substantially along the line VI—VI of Figure III.

Figure VII is a wiring diagram.

Figure VIII is a wiring diagram of electrical apparatus used in a modification of the invention.

Referring to the drawings in detail, the device herein shown and described comprises a base frame 1 provided with fulcrum brackets 2 and 3 upon which, by means of suitable fulcrum pivots, the load-supporting lever system is mounted. This lever system comprises a long lever 4 and a short lever 5 which are provided with other pivots upon which the load-receiver or platform 6 is supported by means of suitable bearings. The end of the long lever, opposite its fulcrum, is provided with a nose pivot 7 which engages a stirrup 8 secured to the lower end of a connecting rod 9 whose upper end is pivotally attached to an intermediate lever 10 which is fulcrumed on a bearing bracket 11 mounted on an inwardly extending shelf 12 of the mechanism cabinet 13 secured to the stationary deck 14 of the base 1. The free end of the intermediate lever 10 pivotally engages a rod 15 secured to and depending from an armature 16 movably stationed within a solenoid coil 17 which is securely fixed, in alignment with the free end of the intermediate lever 10, to a partitioning shelf 18 within the cabinet 13. A rod 19 studded into the top of the armature 16 projects upwardly through, but ordinarily does not touch, a guiding bushing 20 inserted in the upper end of the coil 17, the upper end of the rod 19 being connected to a stirrup 21. The stirrup 21 engages a load pivot 22 fixed in an emission control lever 23. This lever 23 is of the first order, that is, its fulcrum pivot 24 is intermediate the points of application of the load and force.

The lever 23 includes a moulded body 25 preferably made of a light material. Projecting beyond the load pivot 22 is a very light arm 26 and on the opposite side of the fulcrum pivot is a threaded stud 27 on which a counterbalancing weight 28 is adjustably stationed. The purpose of this weight is to counterbalance the weight of the arm 26. A second threaded stud 29 extends upwardly from the body portion 25 upon which weights 30 are threaded. These weights are provided for the purpose of adjusting the static balance of the lever.

In order that the positional relationship of the coil with the attached members and the lever 23 may not readily change, the bracket 32 with the anti-friction bearings 31 upon which the fulcrum pivot 24 of the lever is supported forms a part of the coil retaining bracket 33. The end of the arm 26 of the lever 23 is provided with a thin metal blade 34 which is adapted to move in front of a narrow slot 35 in a mask 36 which covers an opening of a cylindrical container 37 in which an emission-responsive element 38 is located. Opposite the slot 35 is an element 39 which is adapted to radiate emissions.

Surmounting the cabinet 13 is a housing 40 which contains an electrical measuring instrument 41 of the ammeter type which actuates an indicator 42 for co-operation with an indicia bearing chart 43. This chart, in place of the ampere markings, is graduated to show weight units. The emission radiating element 39 which is in aligned position with the slot 35 may be a common electric light bulb. In that case the emission-responsive element will be a photo-electric cell or tube which is responsive to light waves. An element may be used, however, which radiates rays of any kind, such as the so-called "dark rays"—infra-red, ultra-violet, etc., collectively called electromagnetic rays. In each case the responsive element must be a proper one to react under the influence of such rays and in certain cases the blade 34 and the casing member 37 must also be of suitable material; for example, when X-rays are used such material must be lead, to properly shield the responsive element. In this specification we will refer to the emissions as being light waves and the emitting element as an electric light bulb. From this, of course, it follows that the responsive element be a photoelectric cell or tube.

The device is adapted to be electrically connected to a light or power line 50 of alternating current. The primary winding 51 of a transformer 52 is energized by such electric current. This transformer has a plurality of secondary windings 53 and 54. Leads 55, 56, 57, 58, 59 and 60 are tapped on the secondary windings 53 and 54 at such points as insure proper potentials. Leads 56 and 57 feed the filaments of a series of thermionic tubes 61. The output of the first tube is amplified by a transformer 61² in a manner well known. These thermionic tubes amplify the current which feeds the solenoid coil 17. The number of tubes which must be employed depends on the weighing capacity of the scale and the type and size of tube employed. For a scale of small capacity, only a single small tube may be required. The lead 56, which is one of the feeding lines of the thermionic filaments, co-operates with the lead 55 which goes through the ammeter, the solenoid coil, and to the plates of the thermionic tubes to form a circuit. A third pair of taps comprising leads 57 and 58 comprise a circuit in which the lead 58 passes through the emission responsive element to the grid of the thermionic tube. A fourth circuit comprising leads 59 and 60 has one side connected to potentiometers and the other connected to the opposite sides of the potentiometers 62. From the adjustable plates 63 of the potentiometers, connections pass to the grids of the thermionic tubes the connection to one grid passing through a condenser 64. These potentiometers, by varying the current impressed on the grids of the tubes, serve as an adjustment element and are employed as a zero adjustment of the indicating mechanism. When it is desired to indicate at points remote from the location of the cabinet 13 one or more instruments 65 of the ammeter type may be placed in the lead 55 and similar indications will be shown.

When no load is on the platform the lever 23 is in such a state of balance that the blade 34 fastened to its long arm does not completely cover the narrow slot 35 in the member 36 which masks the emission responsive element 38 and a few light waves will strike the responsive element. It is well known that a photo-sensitive element of this type has the characteristic that its resistance to an electric current increases or decreases in response to an increase or decrease in the amount of light which strikes the light-sensitive surface. In this case the small amount of light activates the element to such extent that sufficient current passes to energize the solenoid coil 17, and cause sufficient flux to be set up to counterbalance the initial force occasioned by the dead weight of the lever system and the load-receiver, and it also energizes the indicating member 41 so that its indicator 42 is in registry with the zero indicium on the chart 43. Slight variations in the amount of light or in the current supplied by the power line are instantly compensated for by movement of the blade 34 to increase or decrease the light striking the light-sensitive surface, the current energizing the solenoid 17 and the ammeters 41 and 65 thus being kept constant. When a load is placed on the platform the force resulting therefrom, which is transmitted by the lever system, disturbs the state of balance of the solenoid plunger 16 which connects the intermediate lever 10 to the emission control lever 23 and causes the blade 34 to move out of its initial position, thus exposing a greater amount of the slot to the light emission. When the light striking the photoelectric tube or cell 38 is increased in volume, the element permits a greater amount of electric current to flow through it and thus increases the magnetic flux of the solenoid so that it is capable of resisting a greater force. Slight fluctuations occur, due to the vibration of the scale mechanism, which, however, are of exceedingly short duration and a balance of the forces occasioned by the load and the counterbalancing mechanism is struck almost instantaneously. The amount of current flowing through the ammeter also is in balance with the balanced forces and the indicator 42 points to that indicium on the chart 43 which represents the amount of the force proportional to the weight of the load in pounds. The weight indication is unaffected by small variations in the power line current or the light supply.

For the purpose of increasing the capacity of the indicating instrument 41, a fixed resistance 75 is provided with a manually operated switch 76 which may be shunted around the indicating instrument in a manner which is well known and needs no further explanation.

Thus, referring to Figure VII, the transformer 52 is energized from the alternating current light or power line 50. The transformer 52 comprises a primary winding 51 and secondary windings 53 and 54. Two leads, 56 and 57, from the secondary winding 54 supply current to create a proper potential at the filaments of both thermionic vacuum tubes 61 so that they are heated to temperature to produce the required condition of electronic emission. The grids of the thermionic tubes control the flow of electrons from the filaments to the plates. The thermionic tube 61 on the left in Figure VII has its grid excited from a potentiometer 62 and also from the photoelectric element 38. The potentiometer 62 is energized through leads 59 and 60 from the secondary winding 53 of the transformer 52. Through the adjustable plate or wiper 63 of the potentiometer variable voltage is supplied via the condenser 64 to the grid. One side of the photoelectric element 38 is connected to the lead 58 from the secondary winding 54 of the transformer 52, the other side of the photoelectric element 38 being connected to the grid of the thermionic tube 61 at the left in Figure VII. The excitations from the potentiometer and the photoelectric element combine to determine just how much controlling effect the grid has on the flow of current from the filament to the plate of the thermionic tube. The potentiometer determines the minimum amount of current that shall flow and the photoelectric element the amount of varying additional current. Since the quantity of light that strikes the photoelectric element varies as the result of variations in loads on the scale mechanism, the resistance of the element will decrease proportionately. The potential at the photoelectric element and the filament of the thermionic tube being supplied from the same secondary winding 54, the voltage of the grid relative to that of the filament, and consequently the amount of current passing through the thermionic tube, will vary with amount of light striking the photoelectric element.

The current thus passing through the thermionic tube 61 indicated at the left in Figure VII is not of sufficient magnitude to energize the solenoid 17 to counterbalance the effect of the load on the scale. Hence, this current is used to control variations in the current of greater magnitude through a second thermionic vacuum tube 61 which is shown at the right of Figure VII. The filament of this second tube 61 is also heated by current passing through the leads 56 and 57 from the secondary winding 54 of the transformer 52. The grid of this second thermionic tube is excited through the lower potentiometer 62, indicated in Figure VII, which receives its supply of current from the winding of a transformer 61² as well as through leads 59 and 60 from the secondary winding 53 of the transformer 52. The primary winding of the transformer 61² is supplied with current from the thermionic tube 61 at the left in Figure VII and through the lead 55 from the secondary winding 54 of the transformer 52. Hence, the current supplied to the primary winding of the transformer 61² is proportional to the amount of light striking the photoelectric element 38. The voltage necessary for minimum excitation of the grid of this secondary thermionic tube results from the connection of the secondary winding of the transformer 61² to the potentiometer, the varying increase in such voltage being induced by variations of current in the primary winding of the transformer 61², which variations are controlled by variations in the amount of light falling upon the photoelectric element 38. Thus as the amount of light falling on the photoelectric element varies and the output of the thermionic tube 61 at the left of Figure VII varies proportionately, the controlling effect of the grid of the second thermionic tube at the right in Figure VII also varies proportionately. Since the grid acts to control the flow of electrons from the filament to the plate, the output of the second thermionic tube will vary with the amount of light falling on the photoelectric element.

The second thermionic tube, at the right in Figure VII, is connected in series with the solenoid 17 and with current indicating meters 41 and 65 to the secondary winding 54, the current from the solenoid 17 to the secondary winding 54 of the transformer 52 following the circuit indicated in Figure VII by the numeral 55. Thus, through the two thermionic amplifying tubes, variation in the quantity of light falling upon the photoelectric element causes a variation in the current supplied to the weight counterbalancing solenoid 17, resulting in a state of balance between the lifting effect of the solenoid and the gravitational effect of the load, the amount of current supplied to the solenoid being indicated by the meters 41 and 65, which may be calibrated to indicate in terms of weight of the load.

In a modification of the device the thermionic tubes 61 are replaced by vapor arc rectifying tubes having a grid control 61a (see Figure VIII). The principal reason for the use of such tubes is the fact that an almost unlimited power may be controlled. This permits the adaptation of the device herein described to scales for weighing very heavy loads. In the drawing, two tubes 61a are shown so mounted as to permit full wave rectification of the current. The mechanical principles of the scale or weighing device in this modification are not changed with the exception that the parts are made correspondingly heavier and stronger. A transformer 52a is electrically connected to an electric light or power line 50a. This transformer has a plurality of secondary windings 53a and 54a. Leads 56a and 57a are tapped on the secondary winding and energize the filaments of the vapor arc rectifying tubes 61a. A lead 55a, tapped at the center of the secondary winding 53a, passes through the solenoid coil 17a and the ammeters 65a and 43a. Its other terminal is connected to the anode of the emission responsive element. Other leads connect the cathode of the element 38a with the controlling grids of the vapor arc rectifying tubes 61a. The method of wiring vapor arc rectifying tubes for full wave rectification is so widely known that no further description is necessary.

The mercury vapor tubes employed in the form of the device diagramed in Figure VIII contain each an anode, a cathode and a grid. The mercury vapor tube operates with mercury vapor at such pressure that the electrons, in flowing from cathode to anode, ionize the atoms of vapor. The positive ions of mercury thus produced neutralize the negative space charge of the electrons and hence permit the passage of large currents. This capability of passing large currents makes it desirable to use mercury vapor tubes in scales in which the solenoid is subjected to heavy loads. When used with alternating current the output of the mercury vapor tube can be controlled through the grid by changing the relation of the phase of the grid potential to the phase of the anode to cathode potential. This system of control is used in the form of the device diagramed in Figure VIII. In this form of device, two mercury vapor tubes 61a are employed for the purpose of providing an output of full wave rectified power, which is desirable from the standpoint of smoothness and stability. The primary winding 51a of the transformer 52a is energized from the alternating current light or power trunk line 50a. Through leads 56a and 57a the filaments of mercury vapor tubes 61a are heated to proper temperature for the required electronic emission.

The condenser between the grid and plate and the photoelectric element 38a, in conjunction with the mid tap 55a of the secondary winding 53a, constitute the phase shift circuit. Light falling upon the photoelectric element 38a decreases the resistance of the element, thus causing the phase relation between the grid potential and the anode to cathode potential to be changed and the output of the tube to be increased. The output circuit employing the lead 55a connects in series the mid tap of the secondary winding 53a, the counterbalancing solenoid 17a, the current indicating meters 65a and 43a, the condensers and the tube cathodes. The phase shift varies when the amount of light falling upon the photoelectric element varies. The output of the mercury vapor tubes varies when the phase shift varies. Therefore, the output of the mercury vapor tubes varies with variations in the amount of light falling on the photoelectric element. Otherwise the operation of the device is similar to that using thermionic vacuum tubes.

It will be seen that in the wiring of the modified device, the potentiometer 62 is omitted, and for the purpose of easily and quickly adjusting the zero indication of the device a balance ball 62a is adjustably mounted on the lever 10a.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a load-supporting lever system, an electromagnetic load-counterbalancing means operatively connected to said load-supporting system, a lever actuated by said electromagnetic load-counterbalancing means, a lamp, a photoelectric element, means on said lever for shading said photoelectric element, and electric circuit means controlled by said photoelectric element and controlling said electromagnetic load-counterbalancing means.

2. In a device of the class described, in combination, load-receiving means, load-counterbalancing means connected thereto, the force actuating said load-counterbalancing means being electromagnetic, an electric circuit for creating such electromagnetic force, means for indicating the current flowing in said circuit in terms of weight of the load, a radiation-sensitive element controlling the current in said circuit, and means whereby said radiation-sensitive element is affected by variations in the loading of said load-receiving means.

3. In a device of the class described, in combination, load-receiving means, load-counterbalancing means connected thereto, the force exerted by said load-counterbalancing means being electromagnetic, an electric circuit for controlling the intensity of such electromagnetic force, means for indicating the amount of current flowing in said circuit in terms of weights of loads on said load-receiving means, and means for controlling the current in said circuit comprising a photoelectric element, a light source and a pivoted lever actuated by said load-counterbalancing means and having a member varying the amount of light received by said photoelectric element under the influence of variations in the weights of loads on said load-receiving means.

4. In a device of the class described, in combination, load-receiving means, load-counterbalancing means connected thereto, the force exerted by said load-counterbalancing means being electomagnetic, an electric circuit controlling the intensity of such force, means for indicating the current flowing in said circuit in terms of weights of loads, and means for controlling the current flowing in said circuit comprising a light source, a pivoted lever actuated by said load-counterbalancing means, said pivoted lever carrying means to shade said photoelectric element variably under the influence of variations in weights of loads on said load-receiving means, the current of said electric circuit passing through said photoelectric element and said load-counterbalancing means.

5. In a device of the class described, in combination, weighing mechanism comprising load-receiving means, electromagnetic load-counterbalancing means, a controlling device for said electromagnetic load-counterbalancing means, means whereby said controlling device is influenced by light to vary the force exerted by said electromagnetic load-counterbalancing means, and means whereby the light influencing said controlling device is varied by variations in loads on said load-receiving means.

6. In a device of the class described, in combination, weighing mechanism comprising load-receiving means, electromagnetic load-counterbalancing means, a source of light rays, a controlling device for said electromagnetic load-counterbalancing means, said controlling device being influenced by rays from said source, a member for intercepting variable portions of said rays, and means operatively connecting said member to said load-receiving means whereby variations in the weights of loads on said load-receiving means cause variations in the portion of rays intercepted by said member.

7. In a device of the class described, in combination, weighing mechanism comprising load-receiving means, electromagnetic load-counterbalancing means, light-controlled means for controlling the energization of said electromagnetic load-counterbalancing means, means for varying the light acting upon said light-controlled means, and means operatively connecting said load-receiving means and said light-varying means whereby the light acting upon said light-controlled means is varied under the influence of variations in the weights of loads on said load-receiving means.

8. In a device of the class described, in combination, weighing mechanism comprising load-receiving means, electromagnetic load-counterbalancing means, indicating means, an electric circuit for simultaneously actuating said load-counterbalancing means and said indicating means, a light-responsive element for controlling the current in said electric circuit, means for varying the light received by said light-responsive element, and means operatively connecting said load-receiving means and said light-varying means whereby variations in the light received by said light-responsive element are influenced by variations in weights of loads on said load-receiving means.

9. In a device for counterbalancing loads and indicating their weights, in combination, means varying light rays with variations in loads to be counterbalanced, means utilizing such varying light rays to modulate an electric current, means employing such electric current to indicate the weights of such loads and to create a variable magnetic field, and means using such variable magnetic field to counterbalance such loads.

10. In a device for counterbalancing loads and indicating their weights, in combination, means directing light rays along a path, means intercepting a variable portion of such rays according to varying weights of the loads counterbalanced, means utilizing the unintercepted portion of such rays to modulate an electric current, means employing such modulated current to create a variable magnetic field and to indicate the weights of loads, and means using the variable magnetic field to counterbalance such loads.

MARK A. WECKERLY.